United States Patent
Fuhrmann et al.

(10) Patent No.: US 6,614,527 B2
(45) Date of Patent: Sep. 2, 2003

(54) SPECTRAL BANDWIDTH CALIBRATION OF AN OPTICAL SPECTRUM ANALYZER

(75) Inventors: Thomas Fuhrmann, Eningen (DE); Klaus Steininger, Eningen (DE)

(73) Assignee: Acterna Eningen GmbH, Eningen (DE)

(*) Notice: Subject to any disclaimer, the term of this patent is extended or adjusted under 35 U.S.C. 154(b) by 12 days.

(21) Appl. No.: 10/000,635

(22) Filed: Nov. 1, 2001

(65) Prior Publication Data
US 2002/0080353 A1 Jun. 27, 2002

(30) Foreign Application Priority Data
Nov. 2, 2000 (EP) .............................. 00123824

(51) Int. Cl.$^7$ .................................. G01J 3/28
(52) U.S. Cl. .................. 356/326; 702/85; 250/252.1
(58) Field of Search ....................... 356/326, 328; 702/85; 250/252.1

(56) References Cited

FOREIGN PATENT DOCUMENTS

| EP | 0098443 | 1/1984 |
|---|---|---|
| EP | 0961107 | 12/1999 |
| WO | WO 99/31461 | 6/1999 |

Primary Examiner—F. L. Evans
Assistant Examiner—Kara Geisel
(74) Attorney, Agent, or Firm—Reed Smith LLP

(57) ABSTRACT

In an optical spectrum analyzer, the respective wavelength bandwidths of the optical spectrum analyzer are determined at the wavelengths of the reference lines and used as calibration data for determining measurement tolerances by means of reference lines of known wavelength and known wavelength bandwidths from the known wavelength bandwidths of the reference lines and from the wavelength bandwidths of the reference lines measured with the optical spectrum analyzer

20 Claims, 2 Drawing Sheets

SPECTRAL BANDWIDTH CALIBRATION OF AN OPTICAL SPECTRUM ANALYZER

This application claims Paris Convention priority of European patent application number 00123824.5 filed Nov. 2, 2000, the complete disclosure of which is hereby incorporated by reference.

BACKGROUND OF THE INVENTION

The invention concerns a method for determining measurement tolerances of an optical spectrum analyzer by means of at least one reference line of a known wavelength and known spectral bandwidth, and an optical spectrum analyzer which is suitable for carrying out this method.

It is known that the wavelength display of optical spectrum analyzers (OSA) is re-calibrated with a reference element during operation since the displayed wavelength changes due to aging, temperature, shock and other influences.

EP 0 758 075 discloses calibration of an optical spectrometer by means of one or more reference lines with respect to the absolute wavelength. These reference lines are the minimum in a reference spectrum and very stable. Gas absorption lines are used as reference lines in this case.

U.S. Pat. No. 5,838,437 discloses another possibility of absolute wavelength calibration. Therein, the absolute wavelength calibration is carried out through temperature-stable Fabry-Perot filters and fiber gratings.

These known methods calibrate the OSA only with respect to the absolute wavelength. It is, however, possible that the spectral bandwidth of the OSA changes due to mechanical tolerances, temperature changes, shock, aging or other influences. These changes are not detected by the conventional calibration methods.

A spectral bandwidth which is not exactly known causes measurement errors when measuring the OSNR (optical signal to noise ratio) in optical systems. OSNR is usually measured between a modulated laser and noise. Identical measurements require identical optical bandwidths. Since different OSAs usually have different spectral bandwidths, the spectral bandwidth is usually standardized to 0.1 nm (wherein the noise performance must be converted between actual bandwidth and 0.1 nm). Therein, the spectral bandwidth is the wavelength difference of the points, at which the measured performance has dropped by 3 dB from the maximum value to a higher or lower wavelength. If the actual spectral bandwidth of the OSA changes during operation, the determined OSNR is wrong.

It is therefore the underlying object of the present invention to provide a method for spectral bandwidth calibration of optical spectrum analyzers during operation and provide a corresponding optical spectrum analyzer.

SUMMARY OF THE INVENTION

This object is achieved in accordance with the invention in that, from the known spectral bandwidth of the at least one reference line and from the spectral bandwidth of the at least one reference line measured with the optical spectrum analyzer, the respective spectral bandwidth of the optical spectrum analyzer is determined at the wavelength of the at least one reference line. Preferably, several spectral bandwidths of the optical spectrum analyzer are detected by means of several reference lines of a known wavelength and known wavelength bandwidth.

The measured spectral bandwidth $\Delta\lambda_{Mi}$ of a reference line i (i=1,2, . . . ) is calculated in approximation from the spectral bandwidth $\Delta\lambda_{Ri}$ of this reference line and from the spectral bandwidth $\Delta\lambda_{OSi}$ of the optical spectrum analyzer:

$$\Delta\lambda_{Mi}=\sqrt{\Delta\lambda_{Ri}^2+\Delta\lambda_{OSi}^2}$$

(i=1, 2, . . . ), and therewith the spectral bandwidth $\Delta\lambda_{OSi}$ of the optical spectrum analyzer at the reference line to:

$$\Delta\lambda_{OSi}=\sqrt{\Delta\lambda_{Mi}^2-\Delta\lambda_{Ri}^2}$$

(i=1, 2, . . . ).

The advantage achieved with the invention consists in that spectral bandwidth changes during operation are determined and taken into consideration by suitable recalibration during operation. In this fashion, erroneous measurements of optical spectra can be avoided.

The inventive method of bandwidth calibration can be applied to all kinds of optical spectrum analyzers, such as e.g.

gratings with individual detector, wherein the spectrum is recorded through changing one mechanical variable, e.g. rotation of the grating, gratings with detector array wherein each element of the array records one point of the spectrum; or Fabry-Perot resonator whose length can be tuned thereby scanning the spectrum.

The reference lines in the reference spectrum can either be the maximum or minimum.

The spectral bandwidths determined at the reference lines can be stored either as calibration data of the optical spectrum analyzer and therefore be taken into consideration immediately with each measurement. Alternatively, a measurement spectrum measured with the optical spectrum analyzer can be corrected later by means of the spectral bandwidths determined at the reference lines.

If the spectral bandwidths $\Delta\lambda_{Ri}$ of the reference lines i (i=1, 2, . . . , n) are considerably smaller than their measured spectral bandwidths $\Delta\lambda_{Mi}$, i.e. if $\Delta\lambda_{Ri}<\Delta\lambda_{Mi}$, the respective spectral bandwidth $\Delta\lambda_{OSi}$ of the optical spectrum analyzer can be set approximately identical to the measured spectral bandwidth $\Delta\lambda_{Mi}$ of the $i^{th}$ reference line. Otherwise, e.g. if $\Delta\lambda_{Ri}\geq\Delta\lambda_{Mi}$, the spectral bandwidth of the optical spectrum analyzer can be detected e.g. through deconvolution.

The spectral bandwidths at other wavelengths can be determined through interpolation or extrapolation of the determined spectral bandwidths. The measurement of the reference spectrum and the measurement of the measurement spectrum can be carried out simultaneously or one after the other.

The inventive optical spectrum analyzer for carrying out the above-described method comprises a reference light source, a first storage medium for storing the spectral bandwidths of known reference lines of the reference light source, a spectral bandwidth determination means for determination of the spectral bandwidths of the reference lines measured by the spectrometer and a spectral bandwidth determination means for determining the spectral bandwidths of the optical spectrum analyzer from the known spectral bandwidths of the reference lines and from the spectral bandwidths of the reference lines measured by the optical spectrum analyzer at the respective wavelengths of the reference lines.

A preferred embodiment of the inventive optical spectrum analyzer provides a second storage means which stores the determined spectral bandwidths of the optical spectrum analyzer at the respective wavelengths of the reference lines. Intermediate values and boundary values can be gained through interpolation and extrapolation of the determined spectral bandwidths.

The spectral bandwidths in the second storage medium are preferably initially stored through manufacturer calibration which are then recalculated and correspondingly changed on the basis of the newly gained spectral bandwidths.

Further advantages of the invention can be extracted from the description and the drawing. The features mentioned above and below can be used in accordance with the invention either individually or collectively in any arbitrary combination. The embodiments shown and described are not to be understood as exhaustive enumeration but rather have exemplary character for describing the invention.

DESCRIPTION OF THE PREFERRED EMBODIMENT

Figure 1:
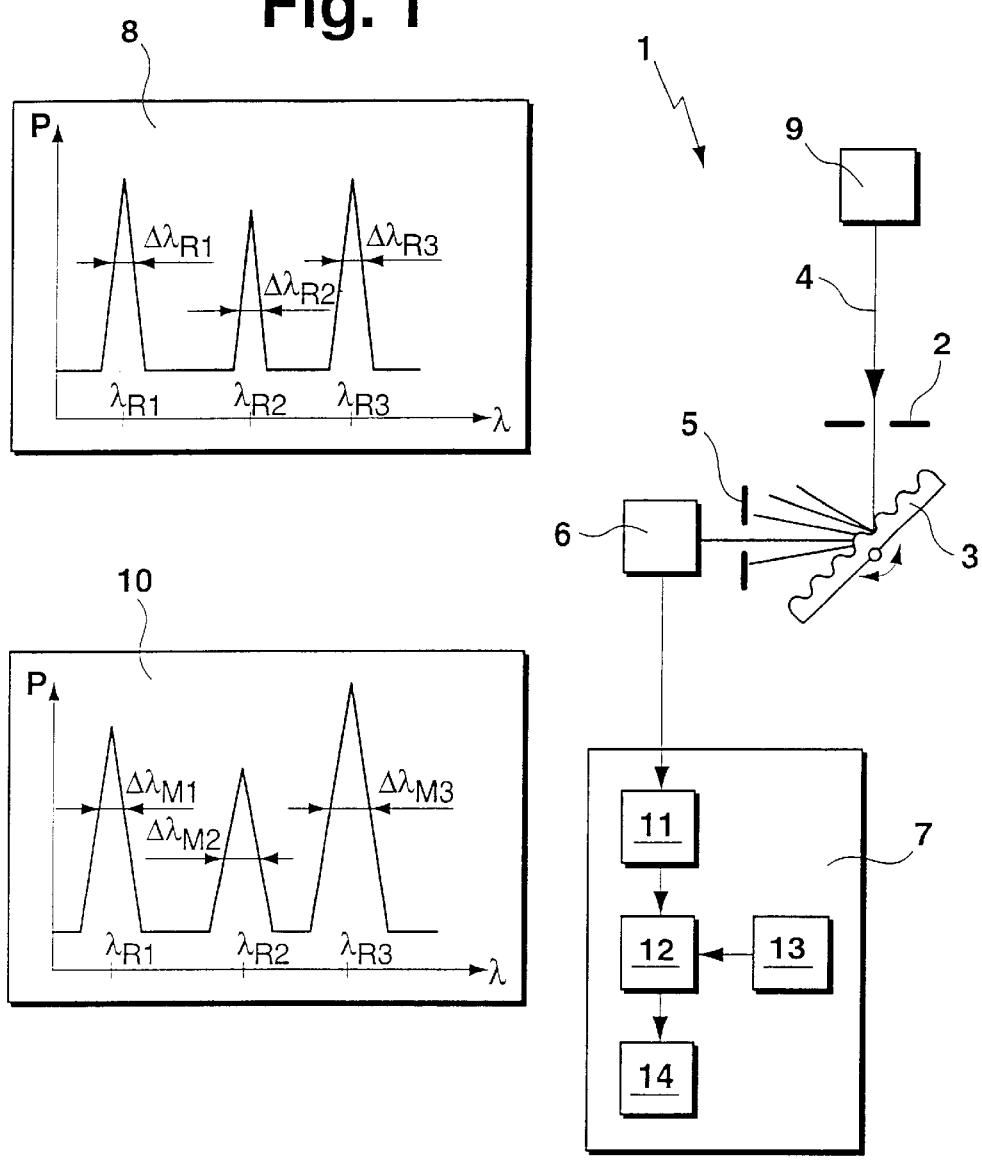
FIG. 1 is flow diagram of the preferred embodiment optical spectrum analyzer of the present invention whose spectral bandwidth is calibrated by means of an optical reference spectrum.

In the optical spectrum analyzer referred to in total with 1 in FIG. 1, the light 4 which passes through an inlet slit 2 onto a rotary diffraction element (reflection grating) 3 is diffracted, thereby spatially dispersing the light into its wavelength components. The spatially dispersed light is directed to an outlet slit 5 acting as spatial filter for the diffracted light such that only the wavelength portion diffracted in the suitable solid angle is allowed to pass to a photodetector 6. The electric output signal of the photo detector 6 is guided to a calibration device 7 for calibrating a measured optical spectrum by means of one or more reference lines with respect to the wavelength.

Calibration is carried out by means of the optical reference spectrum 8 of a reference light source 9 with reference lines whose wavelengths $\lambda_{R1}$, $\lambda_{R2}$, $\lambda_{R3}$ and spectral bandwidths $\Delta\lambda_{R1}$, $\Delta\lambda_{R2}$, $\Delta\lambda_{R3}$ are each known. The performance P is plotted above the wavelength $\lambda$ in the reference spectrum 8. The reference spectrum 8 is guided to the optical spectrum analyzer 1 in the form of incident light 4 and the optical spectrum 10 is measured by the photodetector 6, wherein the measured spectral bandwidths of the reference lines are designated with $\Delta\lambda_{M1}$, $\Delta\lambda_{M2}$, $\Delta\lambda_{M3}$. These measured spectral bandwidths $\Delta\lambda_{Mi}$ are approximately derived from the spectral bandwidth $\Delta\lambda_{Ri}$ of the respective reference line i (i=1, 2, 3) and the spectral bandwidth $\Delta\lambda_{OSi}$ of the optical spectrum analyzer 1 at the respective wavelength $\lambda_{R1}$ according to the following equation:

$$\Delta\lambda_{Mi} = \sqrt{\Delta\lambda_{Ri}^2 + \Delta\lambda_{OSi}^2}$$

(i=1, 2, 3), and thus the spectral bandwidth $\Delta\lambda_{OSi}$ of the optical spectrum analyzer 1:

$$\Delta\lambda_{OSi} = \sqrt{\Delta\lambda_{Mi}^2 - \Delta\lambda_{Ri}^2}$$

(i=1, 2, 3).

Figure 2:
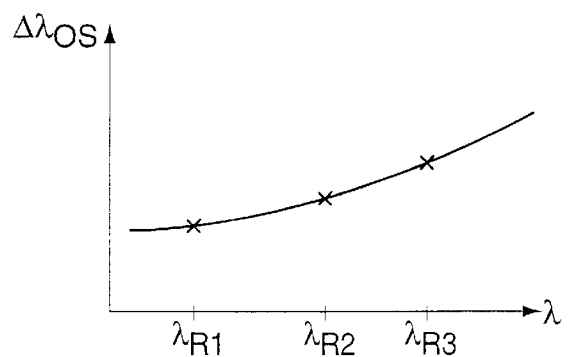
FIG. 2 is a graph of the dependence of the spectral bandwidth of the optical spectrum analyzer on the reference wavelength.

In the calibration means 7, the measured spectral bandwidths $\Delta\lambda_{Mi}$ are determined with a spectral bandwidth determination means 11, and the spectral bandwidths $\Delta\lambda_{OS1}$, $\Delta\lambda_{OS2}$, $\Delta\lambda_{OS3}$ of the optical spectrum analyzer 1 are calculated with a spectral bandwidth determination means 12 from the known spectral bandwidths $\Delta\lambda_{R1}$, $\Delta\lambda_{R2}$, $\Delta\lambda_{R3}$ of the reference lines stored in a storage means 13, for each reference line in accordance with the above-mentioned equation. This dependence of the spectral bandwidths $\Delta\lambda_{OS1}$, $\Delta\lambda_{OS2}$, $\Delta\lambda_{OS3}$ of the optical spectrum analyzer 1 on the wavelength $\lambda$ is schematically shown in FIG. 2 and is stored as calibration curve in a storage means 14 of the calibration means 7. The intermediate values and boundary values shown are obtained through interpolation and extrapolation of the determined spectral bandwidths. This calibration curve is taken into consideration when measuring an optical spectrum.

A light source with a broad-band spectrum can be used as reference light source 9, wherein one or more wavelength-selective elements are connected downstream such as e.g. absorption cells, temperature-stabilized Fabry-Perot interferometers or temperature-stabilized fiber gratings. It is also possible to use a narrow-band light source whose wavelength is stabilized.

The broad-band calibration is not limited to the grating OSA of FIG. 1 but can be applied for all types of optical spectrum analyzers.

Figure 3:
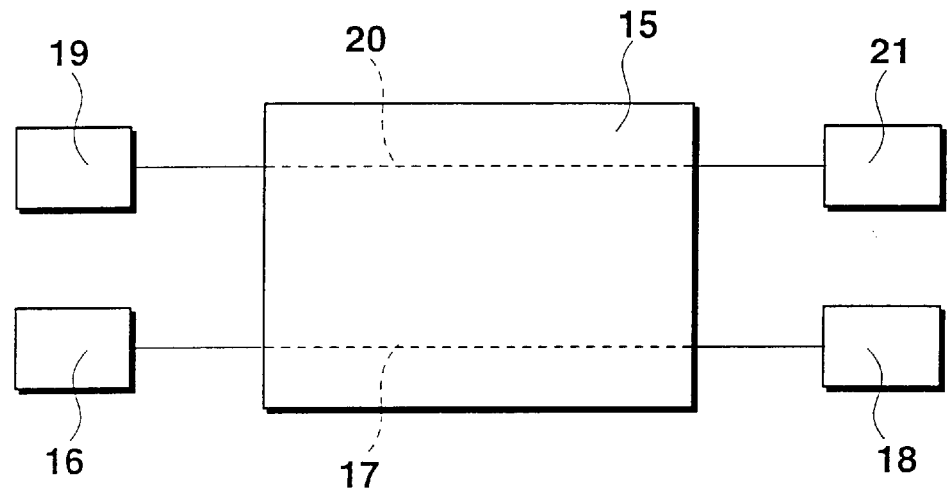
FIG. 3 is a block diagram of the present invention alternative embodiment wherein an optical spectrum analyzer is provided with separate paths for the reference and measurement spectrum.

FIG. 3 shows an optical spectrum analyzer 15 having two separate paths for the reference and measurement spectrum. The reference spectrum 16 is guided on the reference path 17 to a receiver 18 and a measurement spectrum 19 is guided on the measurement path 20 to a receiver 21. This arrangement permits the simultaneous measurement of reference and measurement spectrum 16,19 by the optical spectrum analyzer 15.

Figure 4:
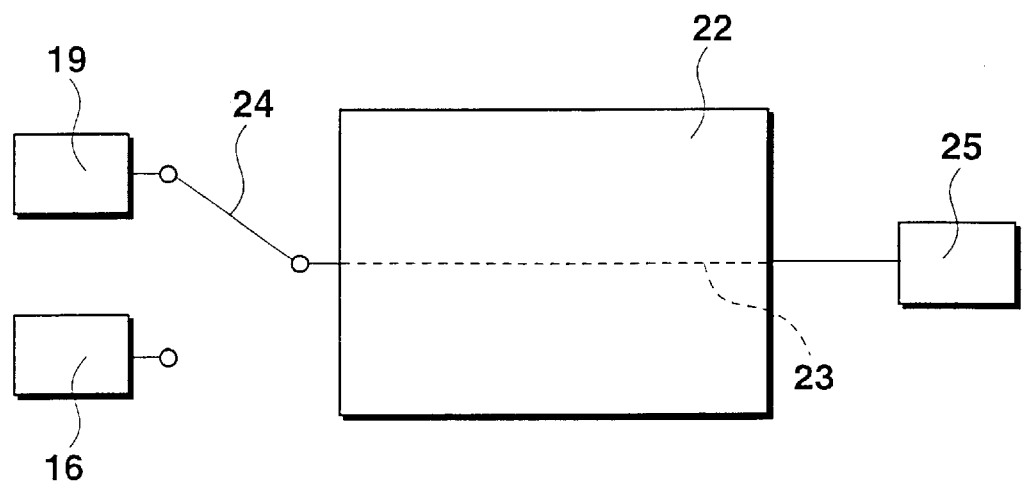
FIG. 4 is a block diagram of another present invention alternative embodiment wherein an optical spectrum analyzer has a common path for the reference and the measurement spectrum using a switch.

FIG. 4 shows an optical spectrum analyzer 22 having one single path 23 for the reference and measurement spectrum. A selector switch 24 permits selection between reference and measurement spectrum 16,19 thereby guiding the respective spectrum on the path 23 through the optical spectrum analyzer 22 to the common receiver 25.

In an optical spectrum analyzer 1, the respective spectral bandwidths $\Delta\lambda_{OS1}$, $\Delta\lambda_{OS2}$, . . . , $\Delta\lambda_{OSn}$ of the optical spectrum analyzer 1 are determined at the wavelengths $\lambda_{R1}$, $\lambda_{R2}$, . . . , $\lambda_{Rn}$ of the reference lines and used as calibration data for determining measurement tolerances by means of reference lines of known wavelength $\lambda_{R1}$, $\lambda_{R2}$, . . . $R_n$ and known spectral bandwidths $\Delta\lambda_{R1}$, $\Delta\lambda_{R2}$, . . . $\Delta\lambda_{Rn}$ from the known spectral bandwidths $\Delta\lambda_{R1}$, $\Delta\lambda_{R2}$, . . . , $\Delta\lambda_{Rn}$ of the reference lines and from the spectral bandwidths $\Delta\lambda_{M1}$, $\Delta\lambda_{M2}$, . . . , $\Delta\lambda_{Mn}$ of the reference lines.

We claim:

1. Method for determining measurement tolerances of an optical spectrum analyzer by means of at least one reference line of a known wavelength and known spectral bandwidth, wherein from the known spectral bandwidth of the at least one reference line and from the spectral bandwidth of the at least one reference line measured with the optical spectrum analyzer, the respective spectral bandwidth of the optical spectrum analyzer is determined at the wavelength of the at least one reference line in approximation via the following formula:

$$\Delta\lambda_{OS}=\sqrt{\Delta\lambda_M^2-\Delta\lambda_R^2},$$

where $\Delta\lambda_R$ is the spectral bandwidth of the at least one reference line, $\Delta\lambda_M$ is the measured bandwidth of the at least one reference line and $\Delta\lambda_{OS}$ is the spectral bandwidth of the optical spectrum analyzer.

2. Method according to claim 1, wherein several spectral bandwidths of the optical spectrum analyzer are determined by means of n reference lines of known wavelength and known spectral bandwidth in approximation via the following formula:

$$\Delta\lambda_{OSi}=\sqrt{\Delta\lambda_{Mi}^2-\Delta\lambda_{Ri}^2},$$

where $\Delta\lambda_{Ri}$ is the spectral bandwidth of the $i^{th}$ (i=1, 2, ..., n) reference line, $\Delta\lambda_{Mi}$ is the measured bandwidth of the $i^{th}$ reference line and $\Delta\lambda_{OSi}$ is the spectral bandwidth of the optical spectrum analyzer at the $i^{th}$ reference line.

3. Method according to claim 1, wherein the spectral bandwidths determined at the reference lines are stored as calibration data of the optical spectrum analyzer.

4. Method according to claim 3, wherein an optical spectrum measured with the optical spectrum analyzer is corrected subsequently by means of the stored calibration data of the optical spectrum analyzer.

5. Method according to claim 1, wherein, if the known spectral bandwidth is smaller than the measured spectral bandwidth of the reference line, the respective spectral bandwidth of the optical spectrum analyzer is set approximately equal to the measured spectral bandwidth of the reference line.

6. Method according to claim 1, wherein, if the known spectral bandwidth is greater than or equal to the measured spectral bandwidth of the reference line, the respective spectral bandwidth of the optical spectrum analyzer is determined through deconvolution.

7. Method according to claim 1, wherein the spectral bandwidths at other wavelengths are determined through interpolation or extrapolation of the determined spectral bandwidths.

8. Method according to claim 1, wherein the measurement of the at least one reference line and the measurement of a measurement spectrum are carried out simultaneously or one after another.

9. Method according to claim 1, wherein the reference line or reference lines are present in the form of a minimum or maximum.

10. Method according to claim 1, wherein several spectral bandwidths of the optical spectrum analyzer are determined by means of several reference lines of known wavelength and known spectral bandwidth, wherein the spectral bandwidths determined at the reference lines are stored as calibration data of the optical spectrum analyzer, wherein an optical spectrum measured with the optical spectrum analyzer is corrected subsequently by means of the spectral bandwidths determined at the reference lines, wherein, if the known spectral bandwidth is smaller than the measured spectral bandwidth of the $i^{th}$ reference line, the respective spectral bandwidth of the optical spectrum analyzer is set approximately equal to the measured spectral bandwidth of the $i^{th}$ reference line, wherein the spectral bandwidths at other wavelengths are determined through interpolation or extrapolation of the determined spectral bandwidths, wherein the measurement of the at least one spectrum line and the measurement of a measurement spectrum are carried out simultaneously or one after another, and wherein the reference line or reference lines are present in the form of a minimum or maximum.

11. Method according to claim 1, wherein several spectral bandwidths of the optical spectrum analyzer are determined by means of several reference lines of known wavelength and known spectral bandwidth, wherein the spectral bandwidths determined at the reference lines are stored as calibration data of the optical spectrum analyzer, wherein an optical spectrum measured with the optical spectrum analyzer is corrected subsequently by means of the spectral bandwidths determined at the reference lines, wherein, if the known spectral bandwidth is greater than or equal to the measured spectral bandwidth of the $i^{th}$ reference line, the respective spectral bandwidth of the optical spectrum analyzer is determined through deconvolution, wherein the spectral bandwidths at other wavelengths are determined through interpolation or extrapolation of the determined spectral bandwidths, wherein the measurement of the at least one reference line and the measurement of a measurement spectrum are carried out simultaneously or one after another, wherein the reference line or reference lines are present in the form of a minimum or maximum.

12. Optical spectrum analyzer for carrying out the method for determining measurement tolerances of an optical spectrum analyzer by means of at least one reference line of a known wavelength and known spectral bandwidth, wherein from the known spectral bandwidth of the at least one reference line and from the spectral bandwidth of the at least one reference line measured with the optical spectrum analyzer, the respective spectral bandwidth of the optical spectrum analyzer is determined at the wavelength of the at least one reference line, wherein the optical spectrum analyzer comprises:

a reference light source;

a first storage means for storing the spectral bandwidths of one or more known reference lines of the reference light source;

a spectral bandwidth determination means for determining the spectral bandwidths of the reference lines measured with the optical spectrum analyzer; and a spectral bandwidth determination means for determining the spectral bandwidths of the optical spectrum analyzer from the known spectral bandwidths of the reference lines and from the spectral bandwidths of the reference lines at the respective wavelengths of the reference lines, measured with the optical spectrum analyzer.

13. Optical spectrum analyzer according to claim 12, characterized by a second storage means for storing the determined spectral bandwidths of the optical spectrum analyzer at the respective wavelengths of the reference lines.

14. Optical spectrum analyzer according to claim 13, wherein initially, the spectral bandwidths from manufacturer calibration are stored in the second storage means.

15. An optical spectrum analyzer for measuring an optical spectrum and calibration apparatus comprising:

a reference light source for providing incident reference light with an optical reference spectrum with plottable reference signal performance lines for known reference wavelengths $\lambda_{Ri}$ and known reference spectral bandwidths $\Delta\lambda_{Ri}$;

an optical spectrum analyzer for separating the reference light into a set of reference wavelength components propagating at different angles of incidence;

an inlet slit which guides the reference light into said optical spectrum analyzer;

a spatial filter with an outlet slit which permits only a subset of the set of reference wavelength components having an incident angle suitable to propagate through said outlet slit to pass said spatial filter;

a photodetector producing an measured light output signal which comprises measured wavelengths $\lambda_{Mi}$ and measured spectral bandwidths $\Delta\lambda_{Mi}$ after detecting said subset; and a calibration device for detecting said measured light output signal and for calibrating said optical spectrum analyzer by comparing one or more of said known reference spectral bandwidths $\Delta\lambda_{Ri}$ to the measured output signal with said measured spectral bandwidths $\Delta\lambda_{Mi}$ which are plotted as performance P above said known reference wavelengths $\lambda_{Ri}$ being examined in the optical reference spectrum to determine the spectral bandwidth $\Delta\lambda_{OSi}$ of said optical spectrum analyzer and to calculate a calibration curve including plotted points determined according to the formula:

$$\Delta\lambda_{OSi} = \sqrt{\Delta\lambda_{Mi}^2 - \Delta\lambda_{Ri}^2}$$

wherein (i=1, 2, 3. . . ).

16. The optical spectrum analyzer for measuring an optical spectrum and calibration apparatus of claim 15 wherein:

said calibration device for detecting said measured light output signal and for calibrating said optical spectrum analyzer is adapted to correct said optical spectrum analyzer by correcting data from said measured light output signal immediately during operation of said optical spectrum analyzer.

17. The optical spectrum analyzer for measuring an optical spectrum and calibration apparatus of claim 15 wherein:

said calibration device for detecting said measured light output signal and for calibrating said optical spectrum analyzer is adapted to correct said optical spectrum analyzer by correcting data from said measured light output signal after operation of said optical spectrum analyzer.

18. The optical spectrum analyzer for measuring an optical spectrum and calibration apparatus of claim 15 wherein:

said plottable reference signal performance lines show optical signal strength in relation to signal noise.

19. The optical spectrum analyzer for measuring an optical spectrum and calibration apparatus of claim 15 wherein:

said optical spectrum analyzer includes separate paths for said optical reference spectrum and for a measured light spectrum to generate said measured light output signal.

20. The optical spectrum analyzer for measuring an optical spectrum and calibration apparatus of claim 19 further comprising:

a selector switch located before said photodetector permitting selection between said separate paths for said optical reference spectrum and said measured light spectrum.

* * * * *